United States Patent Office 3,412,637
Patented Nov. 26, 1968

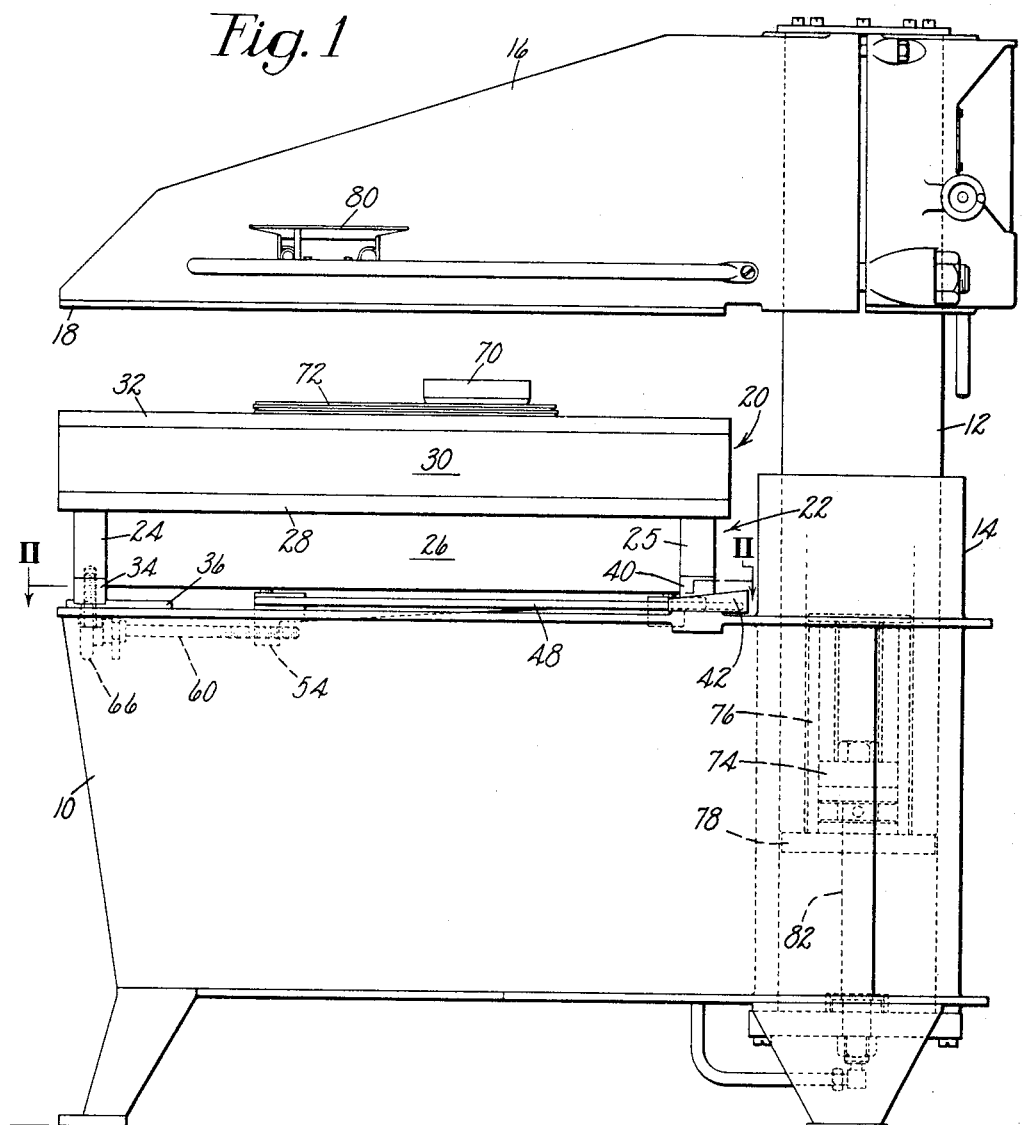

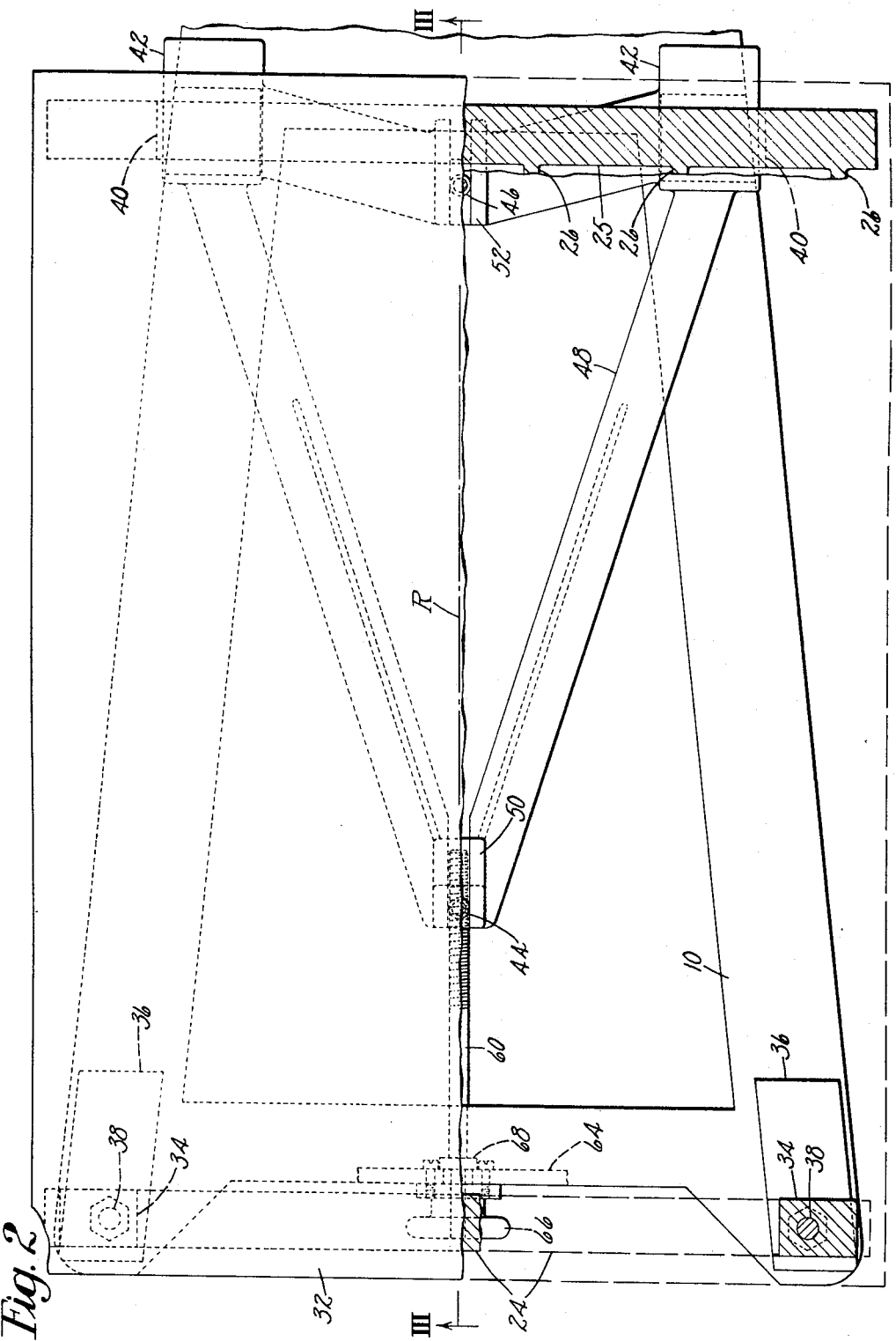

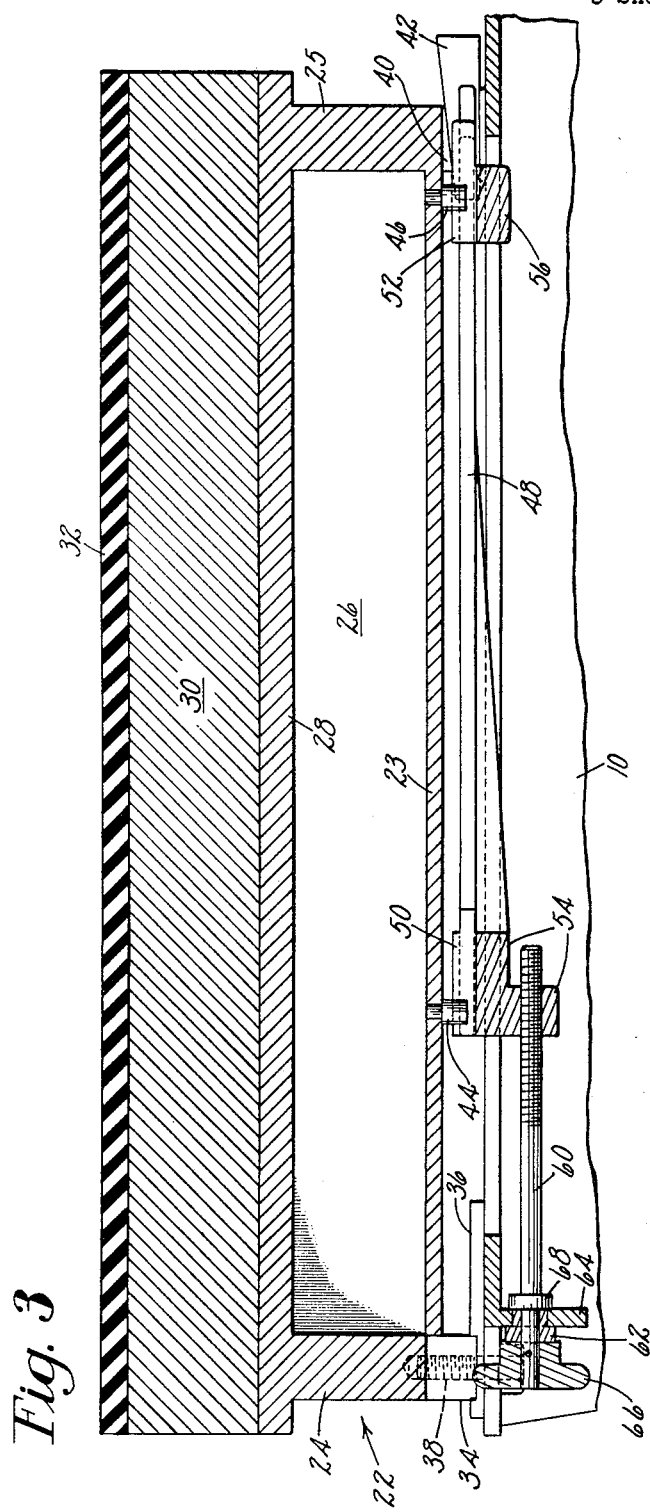

3,412,637
ADJUSTABLE WORK SUPPORTS FOR PRESSES
Richard W. Hitchcock, Beverly, Mass., assignor to United Shoe Machinery Corporation, Flemington, N.J., a corporation of New Jersey
Filed July 27, 1966, Ser. No. 568,205
2 Claims. (Cl. 83—539)

ABSTRACT OF THE DISCLOSURE

A cutting press of the clicker type is provided with a tilt-table cutting support the attitude of which is adjustable by manual operation of a readily accessible member in effecting translation of wedge means.

---

This invention relates to improvements in clicker die cutting presses which type of press is used for dieing out parts from sheet material by pressing a cutting die through sheet material on a work support constituting one of two cooperating presser members, the other being a beam carried on a vertical post at one side of the work support. More particularly, this invention relates to improvements in work supports for such presses whereby adjustment thereof to different cutting circumstances is facilitated.

Presses of the foregoing type employ power means for moving the beam toward the work support. The strain produced by the force of such means during cutting produces reflection of the presser members, i.e. the work support and the beam, characterized by a change in the relative angular disposition of the work engaging surfaces of the presser members. This deflection is known to produce canting of the cutting die with respect to the work support at the time of cut-through and, accordingly, certain measures have been taken or suggested for compensating for the deflection since such canting of the die produces increased wear of the work support surface or incomplete cutting of the sheet material. Such measures have included, for example, providing the press with work surfaces of the presser members at a "toe-in" angle so that in unloaded condition the distance between their opposed work surfaces decreases progressively with the radial distance from the post which mounts the beam.

It also has been found that the deflection increases in proportion with the length of the die perimeter, i.e. the linear amount of die metal which must be forced through the workpiece, and with the distance from the post at which the die is used. However, the means for adjusting the angle of the work support to accommodate different circumstances have been relatively difficult to use commonly requiring the use of tools at inconvenient locations. This perhaps reflects the idea that it was not considered important to make minor adjustments exactly to accommodate deflections except as in avoiding obviously excessive wear of the work support and that the concept of thereby facilitating cutting or even making it possible had not existed.

With the growing use of such presses in general industry as contrasted with their former use primarily in the shoe industries, such presses are being called upon to cut a much wider variety of materials than was formerly the case. Some of these materials are much harder to cut than leather; for example, certain nylon materials are remarkably tough.

I have found that the adjustment of what hereinafter will be called the "tilt angle" of the work support, by which is meant the inclination of the surface of the work support generally with respect to the frame of the machine and hence, to the beam, is critical with respect to the ability of the beam successfully to force the larger dies through such material. I believe, though I do not wish to be limited by statement, that the adjustment must render the opposed working surfaces approximately parallel at the maximum force required for a cut.

It is accordingly an object of the present invention to provide means for critically adjusting the tilt angle of the work support with a high degree of accuracy but which means will be simple and convenient for the operator to use.

Another object of the invention is to provide a means for critically adjusting the tilt angle of the work support which means will be simple and economical, while providing a maximum stability of the work support against distortion thereof under stress.

To this end, and in accordance with a feature of the present invention there is provided in a press of the foregoing type a work support mounted on the frame of the press for tilting movement and manually operable means for adjusting the tilt angle of the work support with a high degree of both accuracy and stability.

In accordance with a further feature of the present invention the work support comprises a rigid table connected to the frame for tilting on a predetermined axis adjacent one end of the table and supported by the frame adjacent its other end through intermediate wedge means connected to manually operated means for providing translatory movement of the wedge means whereby the tilt angle of the table may be varied in minute degrees while the table remains stable in all positions of adjustment.

Further features and advantages of the invention will be best understood from the following description taken together with the accompanying drawings in which:

FIG. 1 is an elevation of a press embodying the present invention;

FIG. 2 is a horizontal view partially in section taken along line II—II on FIG. 1; and FIG. 3 is a longitudinal vertical section taken along line III—III on FIG. 2.

Referring to the figures, the illustrative press which embodies the present invention comprises a frame 10 on which a post 12 is mounted in a cylindrical bearing 14 which is suitably welded or otherwise firmly secured to the frame 10. This mounting for the post provides for its axial and rotational movement. Longitudinal and transverse directions herein are referred to the median radial R (FIG. 2) from the post axis with respect to the frame. A bear 16 carried by the post 12 includes a striking plate 18 providing a first flat work engaging surface. On the frame 10 is a work support indicated generally by the reference numeral 20, providing a second flat work engaging surface opposable to that on the beam. The work support comprises a rectangular fabricated steel table 22 having a bottom plate 23, transverse walls 24 and 25, longitudinal ribs 26 and a top 28 on which table is disposed a wooden block 30 and a cutting pad 32. At the corners of the table remote from the post 12, leg blocks 34 welded to the wall 24 are supported on pads 36 which in turn rest on the frame 10. This end of the table is attached to the frame by screws 38 extending upwardly through the frame and threadedly received in the leg blocks 34 and the wall 24. The wall 25 at the end of the table nearest the post 12 is also provided at its bottom with two leg blocks 40. This end of the table is not fastened down to the frame, but rather, the leg blocks 40 rest on wedges 42. In the bottom plate 23 are two shoulder pins 44 and 46 press fitted in longitudinal alignment. These pins restrain to a longitudinal path the movement of a triangular assembly 48 (FIG. 2) which includes slide blocks 50 and 52 grooved to receive the pins 44 and 46 respectively and which have dependent portions 54, 56 respectively received in slots in the top of the frame 10. The wedges 42 are attached to and moved with the assembly 48 during which movement the leg blocks 40 ride up or down on the wedges 42 to effect tilting of the table 22 about a transverse axis approximately defined by the leg blocks 34, the very slight angular motion at the axis being accommodated chiefly by springing of the screws 38.

Manual means for shifting the longitudinal disposition of the assembly and wedges 42 comprises a rod 60 having one end threadedly engaging the portion 54 of the block 50 while the other end extends through bushings 62 in a front panel 64 of the frame where a handle comprising a hand wheel 66 is pinned to the rod. Longitudinal thrust is transmitted from the rod 60 to the panel 64 either by the bushing 62 or by a collar 68.

Power means for moving the beam toward and away from the cutting pad 32 for pressing a die 70 through a workpiece 72 comprises a vertically fixed rotatably mounted piston 74 (FIG. 1) and a cylinder 76 which connects with the post 12 through a spindle head 78. Upon actuation of a finger plate 80 through control means (not shown) hydraulic pressure fluid is supplied to the cylinder 76 through a hollow piston rod 82 to cause the beam to be moved toward the work support until automatic termination of the stroke by the control means upon completion of the cut whereupon the beam is returned to rest position by spring means (not shown).

Critical and positive adjustment of the tilt angle of the work support by the aforesaid manually operated means will be seen to be quickly and easily accomplished by the operator to suit the working conditions. While I believe that the optimum tilt angle is that at which the opposed work engaging surfaces are parallel during the deflection produced by the maximum applied pressure force necessary for any given cut, the objective test of the best cutting angle determined by a few trials is the most practical method of quickly and easily arriving at the proper adjustment, this method being, of course, facilitated by the ease of adjustment of the tilt angle of the work support.

Having thus described my invention, what I claim as new and desire to secure by Letters Patent of the United States is:

1. A die cutting press having a cutting table mounted for tilting movement and providing a work supporting surface, a presser member carried by support means at one side of said table for movement toward and away therefrom for pressing dies through workpieces on said table in cutting out parts, translatable wedge means disposed beneath a portion of said cutting table for supporting said table in fixed disposition at a variable tilt angle, a readily accessible manually actuatable member and control means operated by said readily actuable member for effecting translation of said wedge means to vary the tilt angle of said table.

2. Apparatus as in claim 1 in which said cutting table is rectangular and is mounted for tilting on a transverse axis adjacent one end thereof and said wedge means comprises a pair of wedges disposed beneath the opposite end adjacent the corners thereof.

References Cited

UNITED STATES PATENTS

| 1,295,931 | 3/1919 | Schoenky | 83—540 XR |
| 2,021,138 | 11/1935 | Ballard et al. | 83—539 |

FOREIGN PATENTS

| 20,696 | 1906 | Great Britain. |

JAMES M. MEISTER, *Primary Examiner.*